(12) United States Patent
Gattuso

(10) Patent No.: US 9,489,564 B2
(45) Date of Patent: Nov. 8, 2016

(54) METHOD AND APPARATUS FOR PRIORITIZING IMAGE QUALITY OF A PARTICULAR SUBJECT WITHIN AN IMAGE

(71) Applicant: Motorola Mobility LLC, Libertyville, IL (US)

(72) Inventor: Michelle N Gattuso, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 133 days.

(21) Appl. No.: 13/951,064

(22) Filed: Jul. 25, 2013

(65) Prior Publication Data

US 2015/0016693 A1    Jan. 15, 2015

Related U.S. Application Data

(60) Provisional application No. 61/844,934, filed on Jul. 11, 2013.

(51) Int. Cl.
G06K 9/00 (2006.01)
H04N 5/232 (2006.01)
(52) U.S. Cl.
CPC ....... *G06K 9/00221* (2013.01); *G06K 9/00228* (2013.01); *H04N 5/23219* (2013.01)
(58) Field of Classification Search
CPC .............................. H04N 9/045; H04N 5/232
USPC ....................................................... 348/222.1
See application file for complete search history.

(56) References Cited

U.S. PATENT DOCUMENTS

| 6,940,545 | B1 | 9/2005 | Ray et al. | |
|---|---|---|---|---|
| 7,924,340 | B2* | 4/2011 | Kato | G06K 9/00255 348/333.01 |
| 8,311,293 | B2 | 11/2012 | Okada | |
| 8,503,735 | B2 | 8/2013 | Morita | |
| 2007/0079137 | A1 | 4/2007 | Tu | |
| 2008/0136958 | A1 | 6/2008 | Nakahara | |
| 2008/0240563 | A1* | 10/2008 | Takano | H04N 5/23219 382/173 |
| 2010/0231753 | A1* | 9/2010 | Hagiwara | 348/231.6 |
| 2011/0007174 | A1* | 1/2011 | Bacivarov et al. | 348/222.1 |
| 2013/0169853 | A1* | 7/2013 | Luong | 348/345 |

FOREIGN PATENT DOCUMENTS

EP    1962497 A1    8/2008

OTHER PUBLICATIONS

PCT/US2014/046437 International Search Report and Written Opinion, Mailed Oct. 2, 2014.

(Continued)

*Primary Examiner* — Twyler Haskins
*Assistant Examiner* — Fayez Bhuiyan
(74) *Attorney, Agent, or Firm* — Troutman Sanders LLP; James E. Schutz; Christopher W. Glass

(57) ABSTRACT

A device capable of digital imaging detects multiple faces in image data received from an image sensor, performs pattern recognition to check if at least one of the detected faces is a priority face belonging to a ranked set of reference faces, adjusting at least one imaging related parameter (e.g., focus setting, exposure level, depth of focus in a plenoptic camera) of the device based on a region of interest (ROI) corresponding to the highest priority recognized face, and capturing an image.

21 Claims, 9 Drawing Sheets

(56) References Cited

OTHER PUBLICATIONS

Application Buzz, "KLIK: Gaming & Entertainment, Social Networking & Life Style", applicationbuzz.com/catalog/KLIK, Apr. 8, 2013, 2 pages.

Chu-Hui Lee et al., "A ROI Focusing Mechanism for Digital Cameras", Proceedings of the International MultiConference of Engineers and Computer Scientists 2011 (IMECS 2011), Mar. 16-18, 2011, pp. 584-588, vol. I.

Ming-Hsuan Yang et al., "Detecting Faces in Images: A Survey", IEEE Transactions on Pattern Analysis and Machine Intelligence, Jan. 2002, pp. 34-58, vol. 24 No. 1.

Paul Viola and Michael Jones, "Rapid Object Detection Using a Boosted Cascade of Simple Features", Conference on Computer Vision and Pattern Recognition, 2001, 9 pages.

* cited by examiner

METHOD AND APPARATUS FOR PRIORITIZING IMAGE QUALITY OF A PARTICULAR SUBJECT WITHIN AN IMAGE

FIELD

This disclosure relates generally to digital image capture devices.

BACKGROUND

Camera phones came into widespread use in the early 2000s. Initially their digital image quality was low compared to dedicated-purpose cameras. Since then, they have made continual progress in terms of resolution and image quality. The advent of smartphones was accompanied by significant increases in computer processing power of mobile units (cellular telephone handsets). The increased processing power also carried over into tablet computers that evolved from smartphones. With much improved camera quality and powerful microprocessors, smartphones and tablets have lately eclipsed dedicated-purpose consumer-grade digital cameras in terms of popularity.

One popular use of tablets and smartphones is accessing social networks such as Facebook, Google+, LinkedIn, and Orkut. Having a single device with network access, abundant memory, fast microprocessors, and a good quality digital camera has fostered a popular trend in which people capture large numbers of pictures and quickly post them on social networks. The days of judiciously making use of 24 or 36 film exposures are history. The user interfaces in smartphones and tablets emphasize ease of use. The camera control software ('app') in smartphones and tablets has few manual settings and users expect to be able to simply touch a virtual shutter release button to rapidly capture a succession of good quality images.

Cameras, including those in smartphones and tablets, are often used to take group photos. A group often includes persons at significantly varying distances. Certain digital cameras are designed to detect faces and adjust the focus based on one or more of the faces. If the faces are at varying distances, however, all of the faces cannot be focused in the image if the camera has a relatively large fixed aperture. One face may be selected for focusing or a compromise may be made in focusing, but there would no guarantee that a particular person's face would be well focused.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

An electronic device, such as a digital still or video camera, processes viewfinder image data to detect faces. One or more of these detected faces can be compared to one or more reference faces that are ranked and stored in memory of the electronic device. The comparison can use any of a variety of facial recognition algorithms along with compressed or uncompressed reference face images or geometries. A highest-ranked detected face is then used to set a region of interest (ROI) in the viewfinder image. Using that ROI, the electronic device sets a configuration parameter, such as focus or exposure, for the digital camera.

By selecting reference faces that are meaningful to the user of the electronic device, the digital camera can prioritize image quality for a top-ranked detected face. If the highest-ranked reference face is an electronic device's owner, the owner can give the electronic device to another person to take a group photo that includes the owner. Using teachings from this disclosure, the electronic device will automatically prioritize the digital camera to an ROI including the owner's face.

Although reference faces may be captured using the electronic device itself, network access can replace or augment the generation of reference faces (or their feature vectors or geometries). Social networks, tagged online photo and video albums, and networked contacts lists may all be used to collect images of reference faces for facial recognition purposes at the electronic device. Additionally, local images in the electronic device photo or video gallery, contacts lists, and other memory may be used to establish a reference face set.

Figure 1:
FIG. 1 depicts a group photo including a group of persons seated at various distances from a camera used to take the photo.

FIG. 1 depicts a group photo 100 including a group of persons seated at various distances from a camera used to take the photo. Given the large ratio between the distance to closest person and the distance to the furthest person, a conventional smartphone or tablet camera may not be able to keep all of the faces in focus. According to certain embodiments, a device capable of image capture such as for example, a smartphone or a tablet computer equipped with a camera, is adapted to detect faces in image data received from an image sensor, perform facial recognition on one or more of the detected faces in order to determine if a detected face corresponds to stored information corresponding to at least one priority face included in a reference set, and to select as a designated face a high or highest priority detected face that has been recognized, and to set at least one parameter (for example, focus, exposure, or depth in the case of a plenoptic camera) based on a region of interest (ROI) in the received image data that includes the designated face. If multiple detected faces are recognized, then according to certain embodiments a highest priority recognized face will be designated, with the priority being determined by ranking information associated with or inherent in stored information on priority faces. For example information on priority faces may be stored in order of priority in a data structure (e.g., an array) making the ranking inherent in the arrangement of the data structure. The information on priority faces in the reference set can take the form of labeled feature vectors extracted by a facial recognition program.

FIG. 1 represents an image that can be shown on a viewfinder display of the device (e.g., smartphone, tablet computer, or dedicated purpose camera). The device can be programmed to draw an ellipse around each face that has been detected. The device may also be programmed to label each detected face that has been recognized (faces in the reference set) with a person's name, e.g., 'Sue' and 'Jen' as shown in FIG. 1. A special indicia, e.g., a double outline box around a name, e.g., for 'Jen' as shown in FIG. 1 identifies the highest priority face that has been recognized. The ROI for image capture is established corresponding to the region of the image including the highest priority face as described above.

Figure 2:
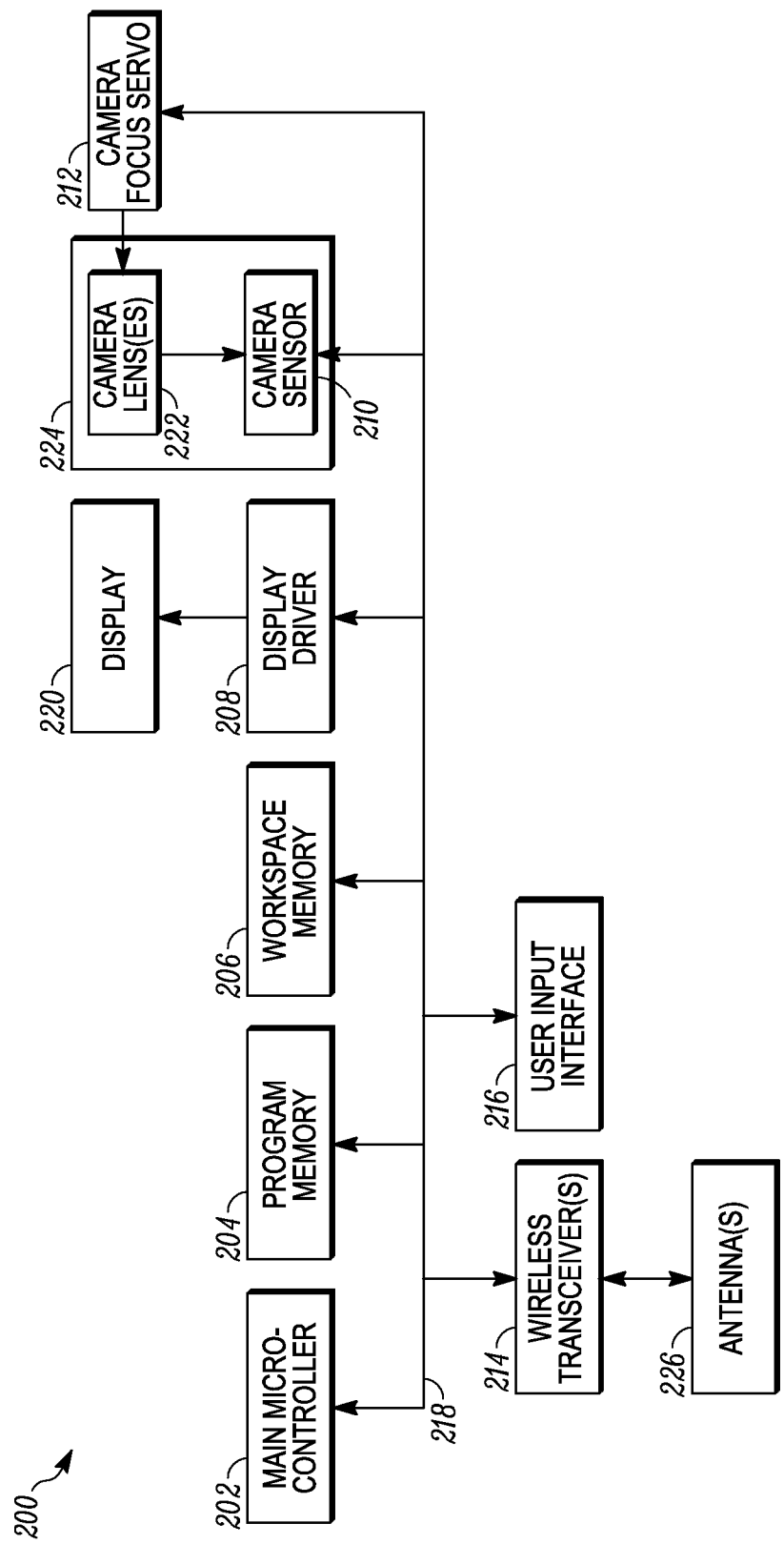
FIG. 2 is a functional block diagram of a device capable of image capture according to an embodiment.
Figure 4:
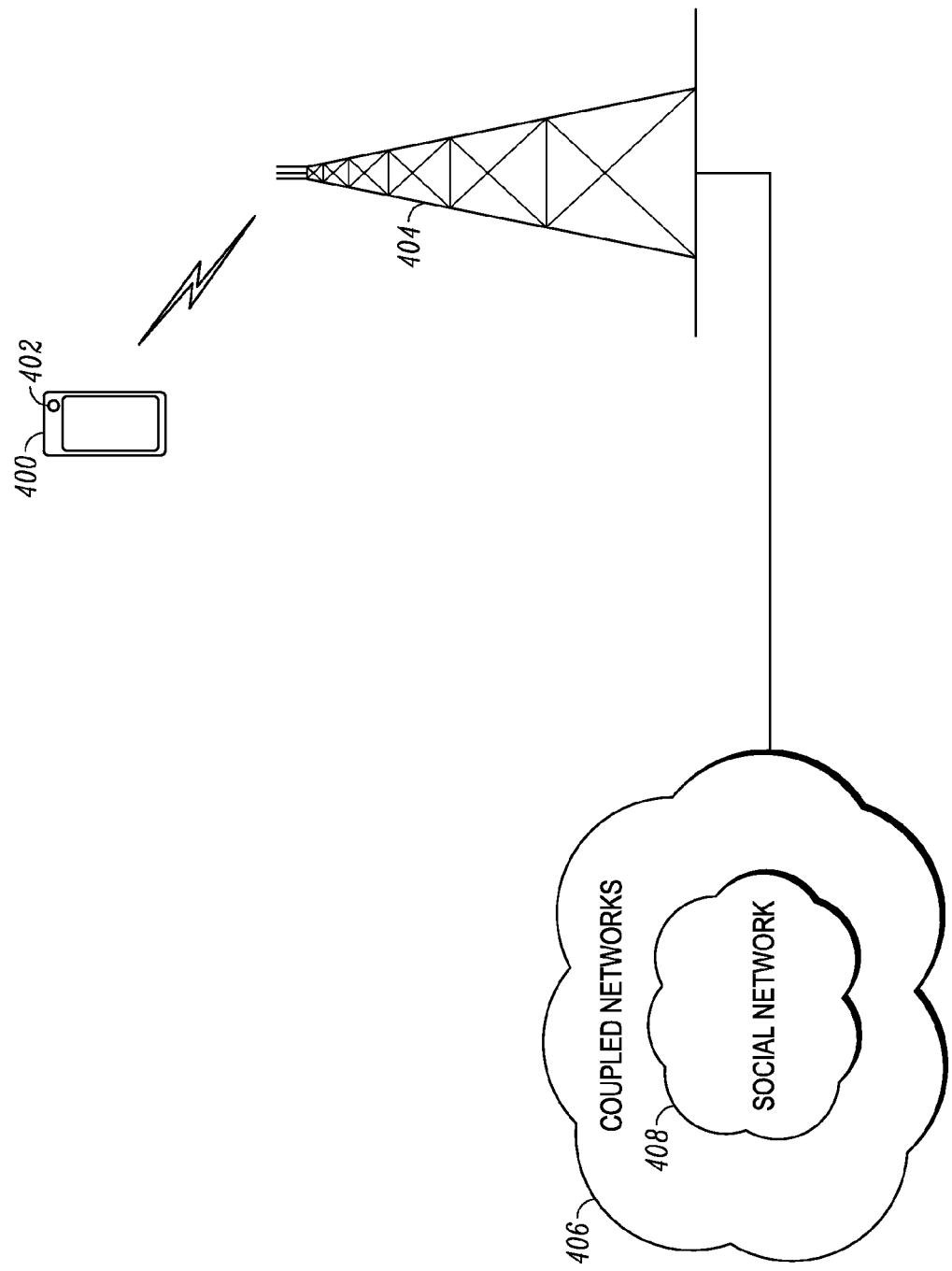
FIG. 4 is a schematic of a network environment in which devices according to certain embodiments can operate.
Figure 5:
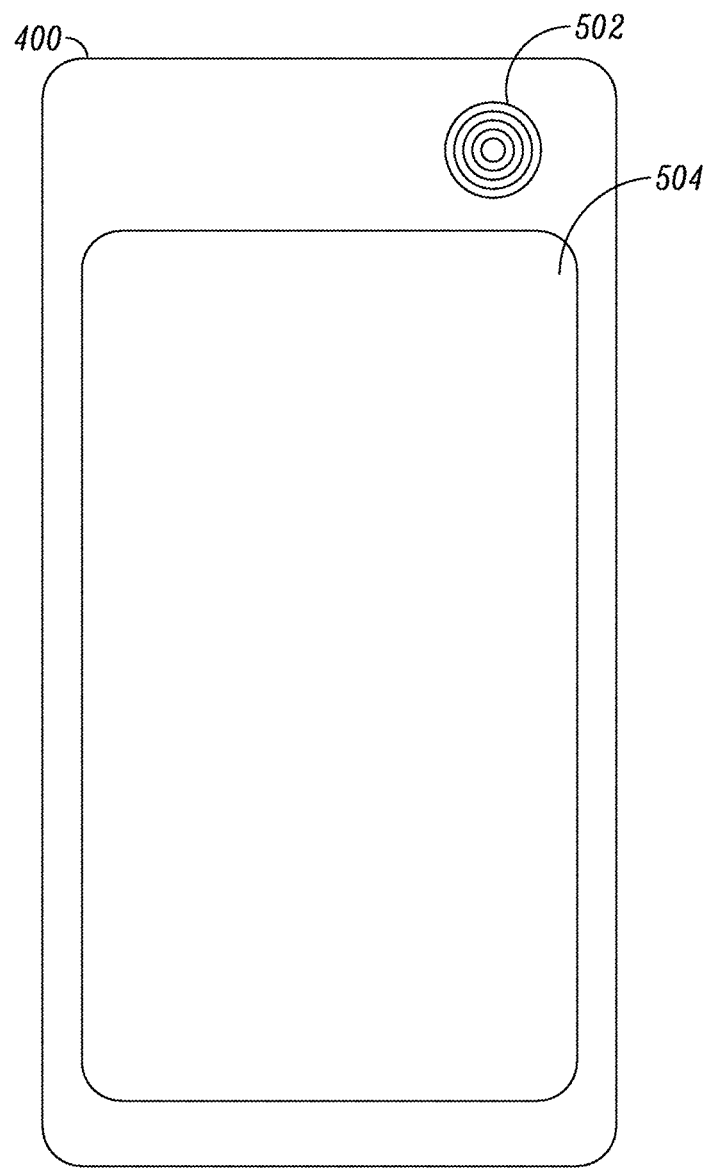
FIG. 5 is a front view of a smartphone showing a front facing camera according to an embodiment.
Figure 6:
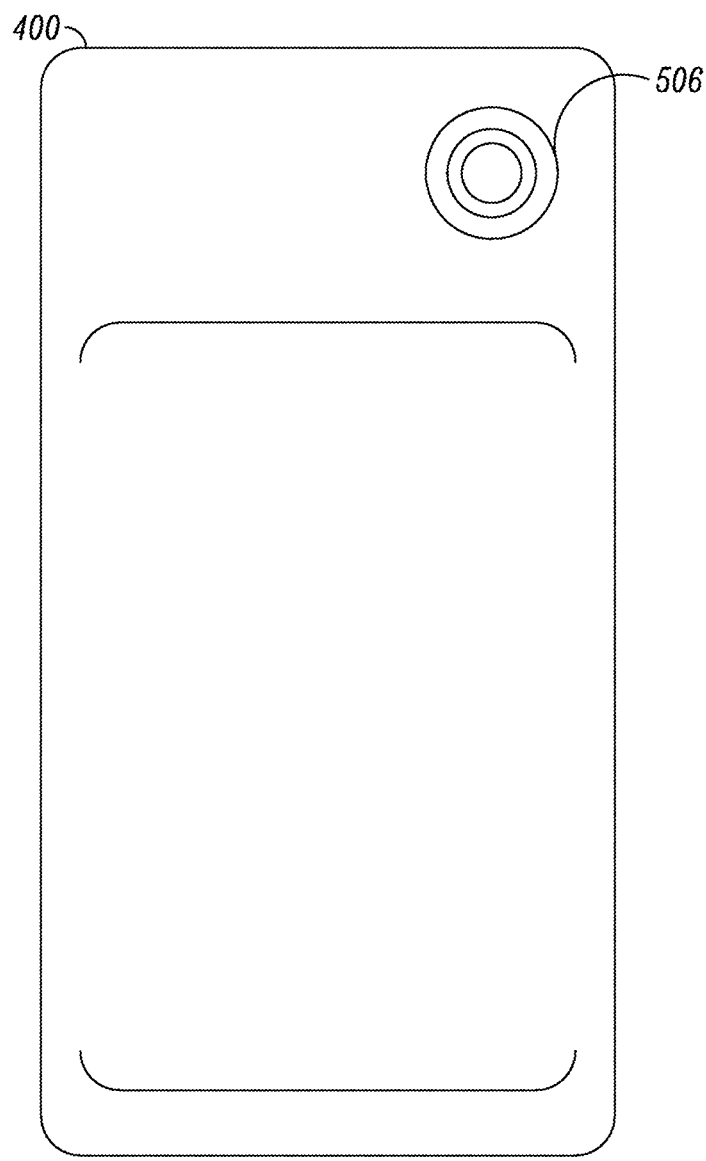
FIG. 6 is a rear view of the smartphone shown in FIG. 5 showing a rear facing camera according to an embodiment.

FIG. 2 is a functional block diagram of a device 200 capable of image capture according to an embodiment. The device 200 can, for example, take the form of a tablet computer, a smartphone 400 such as shown in FIGS. 4, 5, and 6, a dedicated purpose camera or another type of device. Referring to FIG. 2, the device 200 includes a main microcontroller 202, a program memory 204, a workspace memory 206, a display driver 208, a camera sensor (image sensor) 210, a camera focus servo 212, one or more optional wireless transceivers 214 and a user interface 216 coupled together through a system bus 218.

The main microcontroller 202 uses the workspace memory 206 to execute programs stored in the program memory 204, such as programs described by the flowchart shown in FIG. 3 described below. The display driver 208 is coupled to a display 220, which may use a liquid crystal display (LCD) or an organic light emitting display (OLED), for example.

The camera sensor 210 is optically coupled to one or more camera lenses 222. The camera sensor 210 in combination with the one or more camera lenses 222 makes up a camera 224. The camera sensor 210 can include a CCD array or a CMOS array, for example. In certain embodiments, the camera sensor 210 and camera lenses 222 together form a plenoptic camera in which case a lenslet array including a plurality of lenses may be optically coupled to the camera sensor 210.

Alternatively an aperture mask having a array of apertures may be used in lieu of the lenslet array in a plenoptic camera. In the cases that a plenoptic camera has a lenslet array or an aperture mask in front of the camera sensor 210 it may or may not include a main objective lens on the side of the lenslet array or aperture mask opposite the camera sensor 210. Imaging at a non-physical focal plane array, corresponding to different focus distances in the object space can be simulated by appropriately choosing the integration domain over pixels in the real camera sensor 210 for each simulated pixel in the non-physical focal plane array, based on the known 4D (2 spatial plus 2 angular coordinates) corresponding to each real pixel of the camera sensor 210. For each simulated pixel, one would include in an integration pixels of the real camera sensor 210 that correspond to light rays that would pass through the simulated pixel.

The camera focus servo 212 can change the focus of the camera 224 by moving the entire camera lens(es) 222 relative to the camera sensor 210 or by moving one or more lens elements within the camera lens 222.

The optional wireless transceiver 214 (or transceivers) is coupled to one or more optional antennas 226. The wireless transceiver 214 and the antenna 226 can be used to receive stored information that can be used to identify particular faces selected by a user of the device 200. The stored information can include compressed or uncompressed images of particular faces, feature vectors or geometries extracted from images of faces by a facial recognition program, or other information that can serve to identify faces. The stored information may come from a remote server associated with a social networking website or other website. Additionally or alternatively, the stored information may be derived from data captured locally by the electronic device camera originally for gallery, contacts, or other purposes.

The user interface 216 can include physical interface elements such as buttons or switches or use virtual buttons implemented on a touch screen. In the latter case, the user interface 216 can include a transparent touch sensor panel that is positioned over the display 220.

Figure 3:
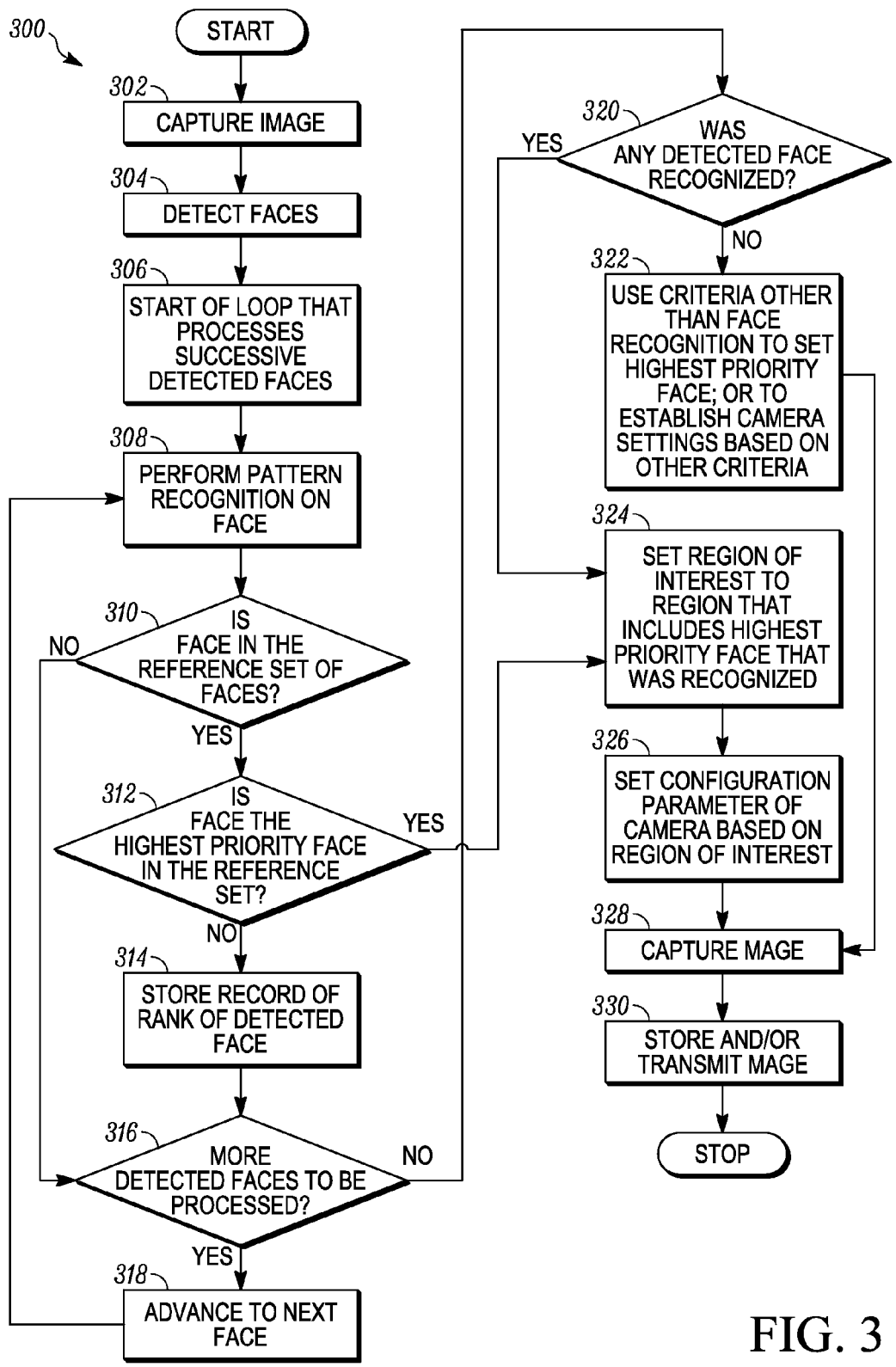
FIG. 3 is a flowchart showing a method of operation for devices such as the device depicted in FIG. 2 according to an embodiment.

FIG. 3 shows a flowchart showing a method 300 of operation for devices such as for example the device depicted in FIG. 2 according to an embodiment. The method 300 can be implemented by a program stored in the program memory 204 and executed by the main microcontroller 202. Referring to FIG. 3, in block 302 a camera sensor 210 captures an image. To facilitate a user composing a photograph, image data from the camera sensor 210 can be displayed on the display 220 and continuously refreshed at a certain frame rate, so that the user views a video of a scene being imaged by the camera 224. At a certain instant, the user interacts with the user input interface 216 to command the device 200 to capture an image which can then be stored in the workspace memory 206. Before the image is captured, the device performs process steps shown in FIG. 3. (Note however that in the case of plenoptic camera and in the case in which the depth of focus will be set in block 326, blocks 304-326 may be performed after the plenoptic image data is captured and stored)

In block 304, the microcontroller detects faces present in image data collected by the camera sensor 210. Face detection software and hardware that is presently known or developed in the future may be used in executing block 304. One known face detection system that may be used is known as Viola-Jones. The Viola-Jones system is implemented in the OpenCV software library. Block 306 is the start of a loop that processes successive face images that were detected in block 304. Note, however, that in certain instances the microcontroller may exit the loop after processing only a single detected face. In block 308, the microcontroller performs pattern recognition (facial recognition) on a detected face corresponding to the current iteration of the loop. A variety of face recognition hardware and software may be used including but not limited to eigenfaces, fisherfaces, and local binary patterns histograms, which are implemented in the openCV software library. In performing facial recognition, a feature vector may be extracted from a detected face and compared to stored information (e.g., feature vectors, or classification parameter space boundaries) representing faces in a reference set. The comparison may also take the form of computing a statistical likelihood that the feature vector extracted from the detected face corresponds to feature vectors representing faces in the reference set.

The reference set includes one or more faces that the owner of the device 200 wants to prioritize in any images captured by the device 200 or one or more faces automatically selected by the device 200. The reference set can, for example include: the face of the owner of the device 200, a face selected by the owner of the device 200, for example a child or spouse of the owner of the device, a face of a person corresponding to a person identified as an emergency contact in information stored in the device; a face of person that is automatically captured when the device 200 is powered up, which would likely but not necessarily be the owner of the device. The device 200 may be programmed to allow a user to select an image of a face already stored in the device, or accessed via a network connection, and have that face added to the reference set. Additionally the device 200 may be programmed to automatically use identifying information for certain persons, such as emergency contacts, to search for an image of the person and automatically add the face extracted from the image to the reference set. Over the long term, the device 200 may store feature vectors of detected faces and automatically add faces that are among the most frequently detected (e.g., the N most frequently detected faces) to the reference set. Provisions can be made in the control programs of the device 200 to allow the user to override any automatic selections and/or to establish and alter the priority ordering of faces in the reference set.

Block 310 is a decision block the outcome of which depends on whether the face processed in block 308 was recognized as a face included in the reference set. If the outcome of block 310 is negative, then the process branches to decision block 316 the outcome of which depends on whether there are more detected faces yet to be processed in the loop commenced in block 306. If the outcome of decision block 316 is positive meaning that there are additional detected faces to be processed, then in block 318 the method 300 advances to a next detected face present in the image captured in block 302 and thereafter loops back to block 308 described above.

If, on the other hand, the outcome of decision block 310 is positive, meaning the face processed in the current iteration of the loop commenced in block 306 does correspond to a face in the reference set, then the method 300 advances to decision block 312, the outcome of which depends on whether the detected face that was recognized as being in the reference set is the highest priority face in the reference set. As described above, a priority order may be established for faces in the reference set. Additionally, when block 310 recognizes that a detected face matches a face from the reference set, a label for the detected face can be added to image data that is displayed on the display 220.

If the outcome of decision block 312 is negative, meaning that the face that was detected and recognized in the current iteration of the loop commenced in block 306 is not the highest priority face in the reference set, then in block 314 the microcontroller stores in the workspace memory 206 a record of the rank of the detected and recognized face within the reference set. Such a record may identify each detected face by the coordinates of a bounding box around the detected face. After executing block 314, the process proceeds to decision block 316 described above.

If the outcome of decision block 312 is positive, meaning that the detected and recognized face is the highest priority face in the reference set, the process branches to block 324 in which the microcontroller sets a Region of Interest (ROI) for the image to a region of the image that includes the highest priority face that was recognized. If block 324 is reached from block 312 it means that a detected face is the highest priority face in the reference set; however this is not always the case and block 324 can be reached from other program branches as described below.

Next, after block 324, in block 326 at least one configuration parameter of the camera 224 is set based on the ROI corresponding to the highest priority face. The camera parameter(s) set in block 324 can include, for example, an exposure setting and a focus setting or in the case of a plenoptic camera a depth of focus setting that is established by image processing as opposed physically moving a lens. Establishing the camera parameter setting(s) base on the ROI that includes the highest priority detected face tends to improve the quality of the image of that face in the captured image. If as in the case of the image shown in FIG. 1 faces are present at widely ranging distances from the camera 224 establishing the focus setting for a conventional camera or the depth of focus for a plenoptic camera based on the ROI for the highest priority detected face tends to improve the image sharpness for that face. If faces of widely varying complexion (e.g., skin tone) are present in the image, then establishing the exposure level based on the ROI including the highest priority face tends to ensure that the exposure level is set correctly for that face.

If the outcome of decision block 316 is negative meaning that there are no more faces that were detected to be processed by the loop commenced in block 306, then the method 300 branches to decision block 320, the outcome of which depends on whether any detected face was recognized as being in the reference set. If the outcome of decision block 320 is negative the process continues with block 322 in which criteria other than recognition of a face is used to set the highest priority face; or other criteria (default criteria) is used to establish camera settings for image capture. If in block 322 a ROI including a face is used to establish camera settings the face can be chosen as the largest face or the face closest to the center of the picture, for example. If the outcome of block 320 is positive, meaning that at least one detected face was recognized, then the microcontroller 202 branches to block 324 previously described. When block 324 is reached from block 320 it means that one or more faces other than the highest priority face in the reference set were recognized.

After executing either block 322 or block 326 the method 300 proceeds to block 328 to capture a still or video image. Thereafter in block 330 the microcontroller stores the image that was captured in block 328 in the workspace memory 206 or transmits it via the wireless transceiver 214.

FIG. 4 is a schematic of a network environment in which devices according to certain embodiments can operate. A smartphone 400 equipped with at least one camera 402 serves as a mobile unit capable of wireless communication in a cellular network represented by base station tower 404. The base station tower 404 is coupled to a set of coupled networks 406. The coupled networks suitably include cellular telephone networks, the Internet, and a social network 408 and/or other websites. Images of faces to be included in the reference set of images may be obtained via the coupled networks 406 from the social network 408 or other websites such as Facebook, LinkedIn, Instagram, Google+, Picassa, or Orkut. The images of faces can be processed by a facial recognition program run on the device 200 or another computer communicatively coupled to the device 200 in order to extract feature vectors to be used in recognizing detected faces.

FIGS. 5 and 6 show front and back sides respectively of the smartphone 400 mentioned above. The smartphone includes a front facing camera 502, a display 504, which is an example of the display 220 (FIG. 2), and a rear facing camera 506. The front facing camera 502 can be used to automatically capture an image of a face (e.g., the owners face) for inclusion in the reference set. Typically the rear facing camera 506 is higher resolution than the front facing camera 502 and is used for photography.

Figure 7:
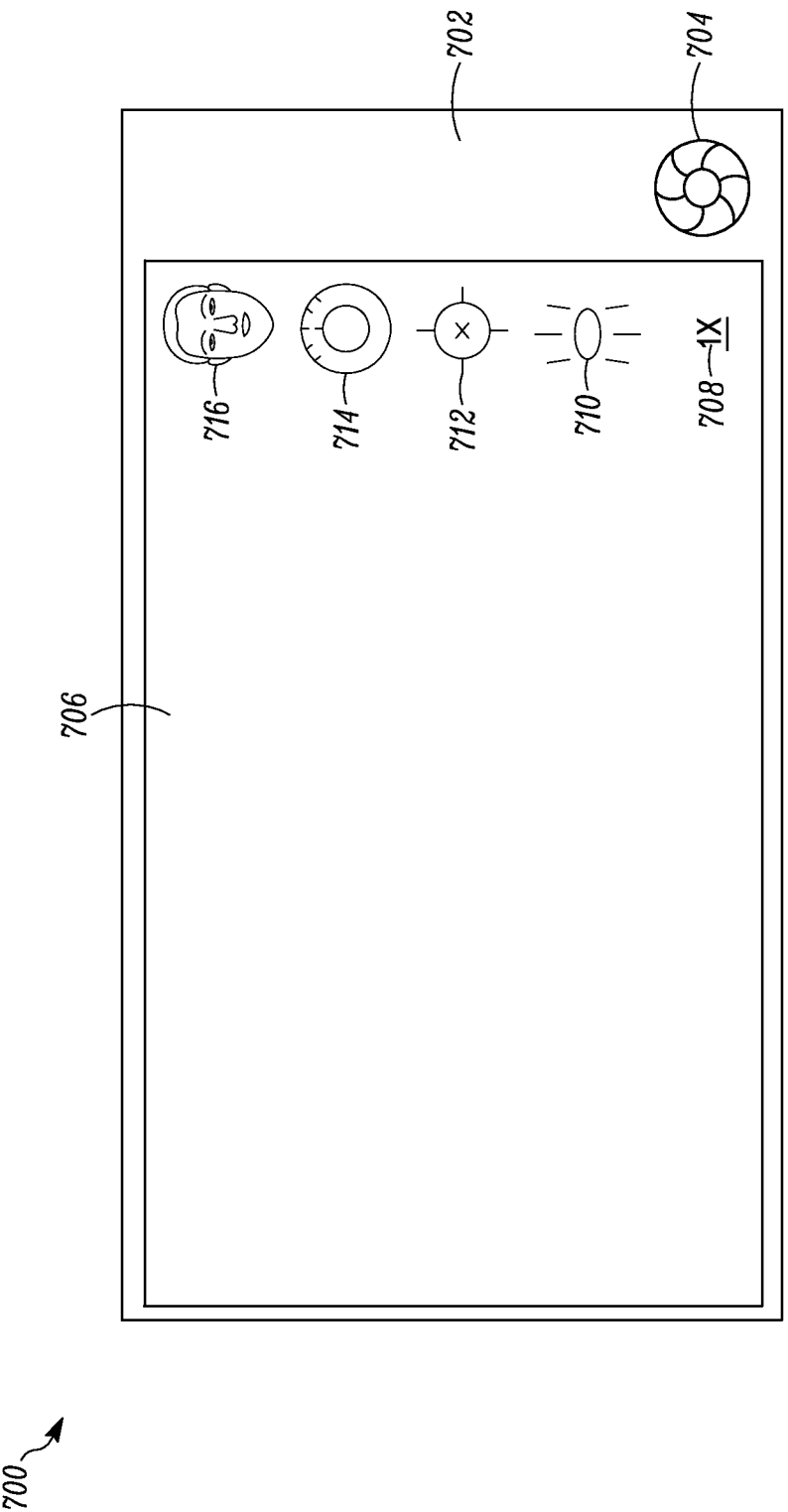
FIG. 7 is a main GUI screen of camera operating software according to an embodiment.

FIG. 7 is a main GUI screen 700 of camera operating software according to an embodiment. The GUI screen 700 includes a side area 702 including a shutter release button 704 (which may be virtual or physical), and a preview display area 706. A number of controls 708, 710, 712, 714, and 716 are arranged in a column on the right side of the preview display area. The controls include a zoom setting 708, a white balance setting 710, a location tagging control 712, a button 714 used to access further settings, and more relevant to the instant disclosure a face icon 716 which serves as GUI button used to access additional screens for managing a set of faces to be prioritized when capturing images as discussed above.

Figure 8:
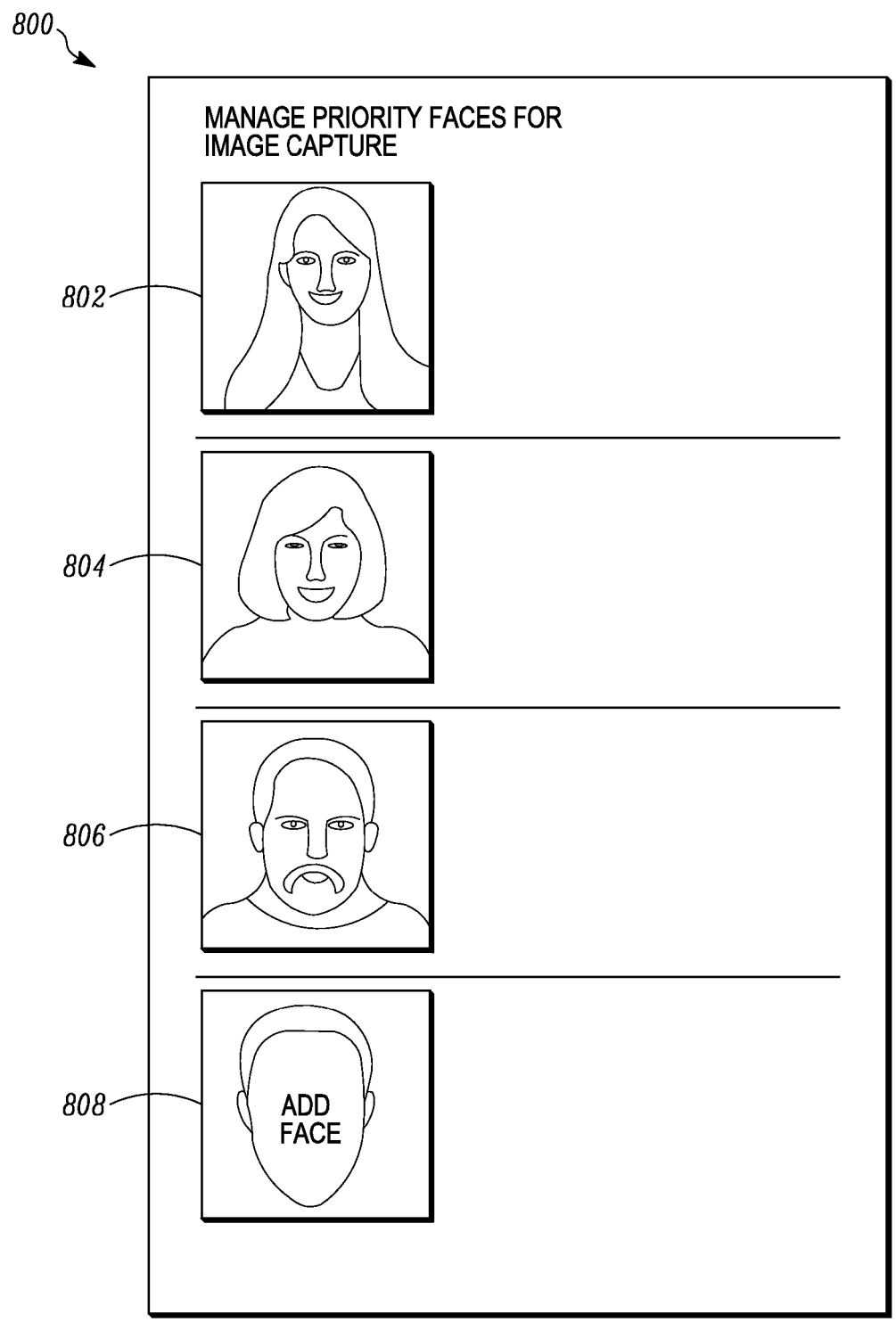
FIG. 8 is a second GUI screen of the camera operating software for managing priority faces for image acquisition according to an embodiment.
Figure 9:
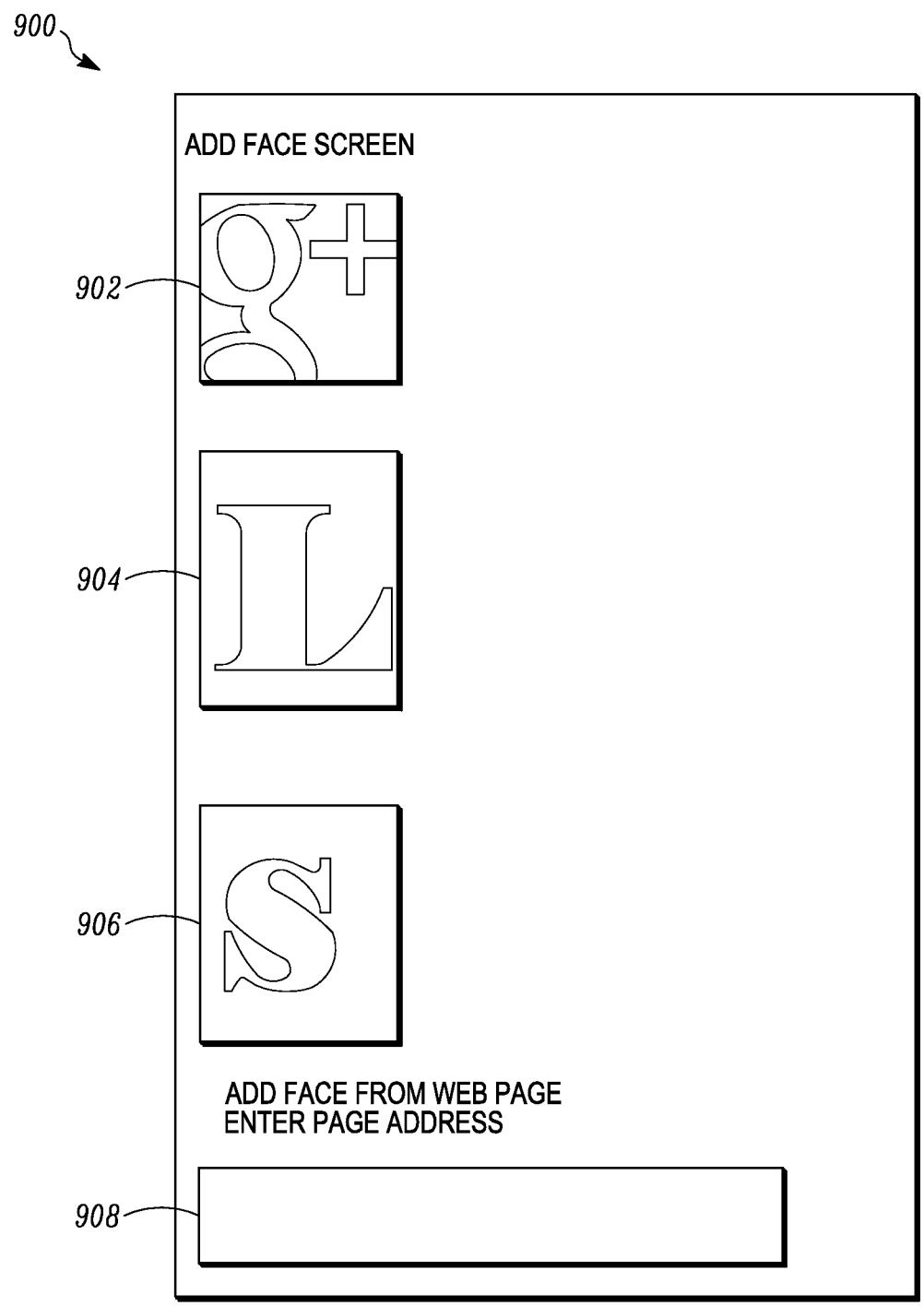
FIG. 9 is a third GUI screen of the camera operating software that is used for acquiring images of priority faces according to an embodiment.

When the face icon button 716 is actuated, the camera operating software presents the GUI screen 800 shown in FIG. 8 which is used for managing priority faces for image acquisition. Faces 802, 804, 806 are shown in order of priority from top to bottom on GUI screen 800. Using dragging gestures (or up-down arrows, not shown) a user can alter the priority of faces. The GUI screen 800 also includes a faceless head icon 'ADD FACE' button 808. When button 808 is pressed, the camera operating software presents a third GUI screen 900 shown in FIG. 9 that can be used for acquiring images of faces to add to the set of priority faces. By default, faces may be added to the top, or bottom, or other position in the set of priority faces.

The third GUI screen 900 includes icons 902, 904, 906 of a plurality websites (or more generally servers) such as those of social networks. As shown the Google+ social network is shown, along with a second social network icon 904, and a third social network icon 906. Actuating one of the icons 902, 904, 906 will retrieve images of faces associated with the user in the respective social network. The user will then be able to select one or more faces to be added to the set of priority faces. Additionally, the third GUI screen 900 includes a text box that the user can use to enter in a URL in order to navigate to a web page that includes a face image that the user desires to add to the set of priority faces. After the web page has been retrieved and displayed, the user will be able to select a face image for addition to the set of priority faces.

According to certain embodiments, an electronic imaging apparatus (e.g., smartphone, tablet computer, or dedicated-purpose camera) includes an image sensor, a memory including data representing a reference set of faces, a processor coupled to the memory and coupled to the image sensor, and the processor is configured to: receive image data from the image sensor, detect a first plurality of face images in the image data, perform facial recognition on at least one of the first plurality of face images that are detected to determine if at least a subset of the first plurality of detected face images is represented in the reference set of faces, in a case that the subset of the first plurality of face images is represented in reference set of faces, making one of the subset of the first plurality of face images a designated face, and setting at least one configuration parameter of the electronic imaging apparatus based on image data in a ROI corresponding to the designated face.

According to certain embodiments the reference set of faces includes a priority ordered set of faces. In certain embodiments, the processor is configured to select as the designated face, a face from the plurality of detected face images that corresponds to a highest ranked face in the prioritized set of face images. The reference set of faces can include a face of an owner of the electronic apparatus, faces selected by a user of the electronic apparatus, a face corresponding to an emergency contact person, and/or a face that has been imaged upon powering up the electronic apparatus. An image of a face in the reference set of faces can be received from a remote device or a social network.

The electronic imaging apparatus can include a variable focus lens coupled to the image sensor, and the processor can be coupled to the variable focus lens and the at least one configuration parameter that is adjusted based on the ROI corresponding to the designated face can be a focus setting of the variable focus lens. Alternatively, the configuration parameter can be an exposure setting of the image sensor. The electronic imaging apparatus can be programmed to allow a user to capture an image of a face from the image sensor and add the face to the reference set.

It should be observed that the embodiments reside primarily in combinations of method steps and apparatus components related to face detection, facial recognition, and image capture. Accordingly, the apparatus components and method steps have been represented where appropriate by conventional symbols in the drawings, showing only those specific details that are pertinent to understanding the embodiments of the present disclosure so as not to obscure the description with details that will be readily apparent to those of ordinary skill in the art having the benefit of this description.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure may use one or more conventional processors and unique stored program instructions that control the one or more processors to implement, in conjunction with certain non-processor circuits, some, most, or all of the functions of face detection, facial recognition, and image capture described here. The non-processor circuits may include, but are not limited to, a radio receiver, a radio transmitter, signal drivers, clock circuits, power source circuits, and user input devices. As such, these functions may be interpreted as steps of a method to perform face detection, facial recognition and image capture. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, this disclosure has described methods and means for these functions. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. An electronic apparatus comprising:
   an image sensor configured to capture an image including a plurality of persons;
   a memory including data representing a ranked reference set of faces;
   a processor, coupled to the memory and to the image sensor, configured to:
      receive image data from the image sensor;
      detect at least one face image in the image data;
      perform facial recognition on the at least one face image;
      in a case that a plurality of face images are detected in the image data and recognized as matching respective faces of the ranked reference set of faces,
         select, as a designated face, a particular face image from the plurality of face images detected in the image data that corresponds to a highest ranked face in the ranked reference set of faces for a person of the plurality of persons,
         detect imaging conditions for a plurality of image regions in the image data,
         identify, as a region of interest, from the plurality of image regions in the image data, a particular image region that includes the designated face, and
         automatically set at least one configuration parameter of the electronic apparatus based on the detected imaging conditions for at least the region of interest such as to prioritize the image quality of the designated face within a captured image of the plurality of persons that is captured using the electronic apparatus according to the automatically set at least one configuration parameter.

2. The electronic apparatus according to claim 1 wherein the reference set of faces includes a face of an owner of the electronic apparatus.

3. The electronic apparatus according to claim 1 wherein the reference set of faces includes at least one face selected by a user of the electronic apparatus.

4. The electronic apparatus according to claim 1 wherein the reference set of faces includes at least one face corresponding to an emergency contact person listed in the electronic apparatus.

5. The electronic apparatus according to claim 1 wherein the reference set of faces includes a face that has been imaged upon powering up the electronic apparatus.

6. The electronic apparatus according to claim 1 wherein the processor is further configured to receive a reference image of at least one of the reference set of faces from a remote device.

7. The electronic apparatus according to claim 6 wherein the processor is configured to receive the reference image from a social network.

8. The electronic apparatus according to claim 1 further comprising:
   a variable focus lens, coupled to the image sensor, wherein the processor is coupled to the variable focus lens, and wherein the at least one configuration parameter includes a focus setting of the variable focus lens.

9. The electronic apparatus according to claim 1 wherein the at least one configuration parameter comprises an exposure setting of the image sensor.

10. The electronic apparatus according to claim 1 wherein, under user control, the processor is adapted to:
    add the at least one face image to the data representing the reference set of faces.

11. The electronic apparatus according to claim 1 wherein the image data includes viewfinder image data.

12. A method of operating an electronic apparatus comprising:
    reading image data from an image sensor configured to capture an image including a plurality of persons;
    detecting at least one face image in the image data;
    performing facial recognition on the at least one face image to determine if the at least one face image corresponds to a face from a ranked reference set of faces;
    in a case that a plurality of face images are detected in the image data and correspond to respective faces of the ranked reference set of faces,
       selecting, as a designated face, a particular face image from the plurality of face images detected in the image data that corresponds to a highest ranked face in the ranked reference set of faces for a person of the plurality of persons,
       detecting imaging conditions for a plurality of image regions in the image data,
       identifying, as a region of interest, from the plurality of image regions in the image data, a particular image region that includes the designated face, and
       automatically setting at least one configuration parameter of the electronic apparatus based on the detected imaging conditions for at least the region of interest such as to prioritize the image quality of the designated face within a captured image of the plurality of persons that is captured using the electronic apparatus according to the automatically set at least one configuration parameter.

13. The method according to claim 12 wherein the selecting as the designated face comprises: comparing a face of an owner of the electronic apparatus to the plurality of face images.

14. The method according to claim 12 wherein the selecting as the designated face comprises: comparing a face selected by a user of the electronic apparatus to the plurality of face images.

15. The method according to claim 12 wherein the selecting as the designated face comprises: comparing at least one face corresponding to an emergency contact person stored in the electronic apparatus to the plurality of face images.

16. The method according to claim 12 further comprising:
receiving data representing at least one reference face of the reference set of faces from a remote device.

17. The method according to claim 12 wherein setting at least one configuration parameter comprises:
setting a focus of a variable focus lens of the electronic apparatus.

18. The method according to claim 12 wherein setting at least one configuration parameter comprises:
setting an exposure of the image sensor of the electronic apparatus.

19. The method according to claim 12 further comprising:
under user control, capturing an image and adding the image to the reference set of faces.

20. The electronic apparatus according to claim 1, wherein detecting the imaging conditions for the plurality of image regions comprises at least one of detecting variation in at least one of respective distances of the plurality of persons from the electronic apparatus and detecting variation in complexion among faces of the plurality of persons.

21. The electronic apparatus according to claim 8, wherein the focus setting of the variable focus lens is selected such as to prioritize the sharpness of the designated face within the captured image of the plurality of persons.

* * * * *